United States Patent
Blichmann

(10) Patent No.: US 10,456,757 B1
(45) Date of Patent: Oct. 29, 2019

(54) IN-LINE CARBONATION SYSTEM

(71) Applicant: John Blichmann, Lafayette, IN (US)

(72) Inventor: John Blichmann, Lafayette, IN (US)

( * ) Notice: Subject to any disclaimer, the term of this patent is extended or adjusted under 35 U.S.C. 154(b) by 83 days.

(21) Appl. No.: 15/412,937

(22) Filed: Jan. 23, 2017

Related U.S. Application Data

(60) Provisional application No. 62/281,766, filed on Jan. 22, 2016.

(51) Int. Cl.
| | | |
|---|---|---|
| *A23L 2/54* | (2006.01) | |
| *B01F 3/04* | (2006.01) | |
| *B01F 15/00* | (2006.01) | |
| *C12C 11/11* | (2019.01) | |

(52) U.S. Cl.
CPC ............ *B01F 3/04808* (2013.01); *A23L 2/54* (2013.01); *B01F 3/04503* (2013.01); *B01F 15/00162* (2013.01); *B01F 15/00175* (2013.01); *B01F 15/00409* (2013.01); *C12C 11/11* (2013.01); *A23V 2002/00* (2013.01); *B01F 2003/049* (2013.01); *B01F 2215/0068* (2013.01)

(58) Field of Classification Search
CPC .............. B01F 3/04808; B01F 3/04503; B01F 15/00162; B01F 15/00175; B01F 15/00409; B01F 2003/049; B01F 2215/0068; A23L 2/54; C12C 11/11; A23V 2002/00
See application file for complete search history.

(56) References Cited

U.S. PATENT DOCUMENTS

| | | | | |
|---|---|---|---|---|
| 2,081,029 A | * | 5/1937 | Young ................... | B01F 3/0473 261/117 |
| 2,116,939 A | * | 5/1938 | Zahm ...................... | C12H 1/14 417/306 |
| 2,226,958 A | * | 12/1940 | Zahm ....................... | A23L 2/38 137/87.04 |
| 2,227,101 A | * | 12/1940 | Meyer ..................... | A23L 2/54 426/477 |
| 2,926,087 A | * | 2/1960 | Rickers .................... | C12H 1/14 261/77 |
| 3,472,425 A | * | 10/1969 | Booth ................. | B01F 3/04808 137/411 |
| 3,746,323 A | * | 7/1973 | Buffington .......... | B01F 3/04808 261/122.1 |
| 4,562,013 A | * | 12/1985 | Jeans .................. | B01F 3/04808 137/516.11 |
| 4,629,589 A | * | 12/1986 | Gupta ................. | B01F 3/04531 222/129.1 |

(Continued)

Primary Examiner — Anthony J Weier
(74) Attorney, Agent, or Firm — Tyler B. Droste; Gutwein Law

(57) ABSTRACT

A method and apparatus for carbonating a liquid in a pressurizable vessel, including first connecting a vessel with a carbon dioxide tank, wherein said vessel contains a liquid. A vessel can then be pressurized with carbon dioxide to a desired first pressure. A pump is activated to circulate the liquid through a hose out of the vessel to a fitting assembly and out of the fitting assembly back into the vessel. While the liquid is flowing through the fitting assembly carbon dioxide is introduced to the liquid at a second pressure level, wherein the second pressure is greater than said first pressure. After a pre-determined period of time the pump is deactivated and the carbon dioxide can cease to be introduced to the liquid flowing through the fitting assembly.

20 Claims, 5 Drawing Sheets

(56) References Cited

U.S. PATENT DOCUMENTS

| | | | | |
|---|---|---|---|---|
| 4,745,853 | A * | 5/1988 | Hoover | A23L 2/54 261/27 |
| 4,804,112 | A * | 2/1989 | Jeans | B67D 1/0057 222/129.1 |
| 4,850,269 | A * | 7/1989 | Hancock | B01F 3/04241 99/323.1 |
| 5,217,621 | A * | 6/1993 | Norris | B01F 3/04099 210/220 |
| 5,510,060 | A * | 4/1996 | Knoll | B01F 3/04262 261/122.1 |
| 8,641,018 | B2 * | 2/2014 | Sonnenrein | A23L 2/54 261/76 |
| 9,700,852 | B2 * | 7/2017 | Shalev | A47J 31/407 |
| 2004/0238975 | A1 * | 12/2004 | Sakakibara | A23L 2/54 261/100 |
| 2005/0260301 | A1 * | 11/2005 | Ooyachi | B01F 3/04269 426/67 |
| 2006/0131332 | A1 * | 6/2006 | Khalaf | B01F 7/00908 222/135 |
| 2011/0226343 | A1 * | 9/2011 | Novak | A23L 2/54 137/12.5 |
| 2015/0047967 | A1 * | 2/2015 | Burton | B01D 1/16 203/49 |
| 2016/0003523 | A1 * | 1/2016 | Kim | F25D 23/126 222/146.6 |
| 2016/0106256 | A1 * | 4/2016 | Gordon | A47J 31/407 99/295 |
| 2017/0120204 | A1 * | 5/2017 | Tipton | A23L 2/54 |

* cited by examiner

IN-LINE CARBONATION SYSTEM

CROSS-REFERENCE TO RELATED APPLICATION

This U.S. patent application claims priority to U.S. Provisional Application 62/281,766 filed Jan. 22, 2016, the disclosure of which is considered part of the disclosure of this application and is hereby incorporated by reference in its entirety.

FIELD OF THE INVENTION

This invention relates generally to an apparatus and method of carbonating aqueous solutions, including beer.

BACKGROUND

In the beer brewing industry, it is known that beer must be carbonated to achieve the desired flavor and palate texture for the end consumer. One method of achieving carbonation in beers is known as krausening, which can be achieved by adding additional fermentable sugars to a beer while in a pressure vessel. This causes a secondary fermentation, a subsequent discharge of $CO_2$, and a natural increase in carbonation to a known level. This method and the method of directly adding fermentable sugar to the beer is known as bottle or keg conditioning, and can leave an undesirable amount of residual yeast sediment at the bottom of the container that may be objectionable to some consumers. In addition, krausening can also takes a week or more to achieve a desired carbonation level.

Alternatively, many breweries and beer bottlers use a force-carbonation method to carbonate their beer, which is accomplished by applying pressurized carbon dioxide ($CO_2$) to the container at a specified temperature. The volume of $CO_2$ (the standard unit used to measure carbonation level in the industry) is easily controlled via a carbonation chart of temperature of the beer and pressure of the $CO_2$. While this process will carbonated beer without additional yeast sediment, it also takes a week or more to dissolve the prescribed amount of $CO_2$ in the beer. In order to expedite this process, a carbonation or carbonating stone can be used. The stone is typically a sintered stainless steel porous cylinder that can be placed into a serving vessel. Common stones contain pores having a diameter from about 0.5 to about 2 microns to deliver very small bubbles into the liquid.

These stones create small bubbles of $CO_2$ to be exposed to the beer. The small bubbles present a very large surface area to the beer, speeding along the dissolution into the beer. However, the stones can be restrictive to $CO_2$ flow and require high pressures from about 20 to about 30 pounds per square inch (PSI) to push $CO_2$ through the stones at an acceptable rate. Additionally, the process still takes days to complete and is a relatively manual process of venting and charging, leading to a fairly uncontrolled level of carbonation due to the high $CO_2$ pressures required wherein the beer may become over-carbonated or under-carbonated based on the skill of the operator.

Over-carbonation occurs when the equilibrium pressure at a given temperature is exceeded. In addition, the venting of the $CO_2$ gas to allow a continual flow of $CO_2$ is wasteful and expensive. Lastly, it is known to place a carbonation stone in-line with a hose running between the fermentation vessel to the dispensing vessel and injecting the $CO_2$ as it is pumped from the fermentation vessel to the receiving vessel. Despite the speed of operation, it is not readily feasible to consistently control the level of carbonation in the beer, resulting in under or over carbonated beer that can drastically affect the beer quality.

It is a primary objective of this invention to provide a carbonation system and process that can overcome the variability in the carbonation level and reduce the time to carbonate from days or weeks to approximately an hour or less. It is also an objective of this invention to create a system and process that results in a consistently carbonated beer regardless of the operator's skill.

BRIEF SUMMARY OF THE INVENTION

In one aspect, this disclosure is related to a method of carbonating a liquid in a pressurizable vessel, comprising first connecting a vessel with a carbon dioxide tank, wherein said vessel contains a liquid. A vessel can then be pressurized with carbon dioxide to a desired first pressure. A pump is activated to circulate the liquid through a hose out of the vessel to a fitting assembly and out of the fitting assembly back into the vessel. While the liquid is flowing through the fitting assembly carbon dioxide is introduced to the liquid at a second pressure level, wherein the second pressure is greater than said first pressure. After a pre-determined period of time the pump is deactivated and the carbon dioxide can cease to be introduced to the liquid flowing through the fitting assembly.

In another aspect, this disclosure is related to a method of applying a pressurized gas to a liquid in a perssurizable vessel, comprising connecting the vessel to a compressed gas tank and a pump using a fitting assembly, wherein the vessel contains a liquid. The pump can be activated to circulate the liquid from the vessel to the fitting assembly through a first hose and from the fitting assembly back into the vessel through a second hose. The pressurized gas can then be introduced into the liquid by the carbonation stone at the fitting assembly at a first pre-determined pressure until the liquid and vessel reach a pre-determined saturation point of gas in the liquid. The pump and pressurized gas can then be deactivated and the vessel disconnected from the pump and pressurized gas tank.

In another aspect, this disclosure is related to an apparatus for in-line carbonating a liquid. The apparatus comprising a pump having an inlet aperture and an outlet aperture, a fitting assembly comprising a carbonation inlet, a fluid inlet, a fluid outlet, and a carbonating stone. The apparatus further comprises a plurality of hoses, wherein said hoses fluidly connect said pump to the fitting assembly and the apparatus both an external vessels to.

In another aspect, this disclosure is related to a system for carbonating a liquid comprising at least one pressurizeable tank having an control valve; at least one vessel; a carbonation apparatus comprising a pump having an inlet aperture and an outlet aperture, a fitting assembly comprising carbonation inlet, a fluid inlet, a fluid outlet, and a carbonating stone; and at least one hose, wherein said hose fluidly connect said pump to said fitting assembly; and a plurality of hoses interconnecting said carbonation apparatus to said vessel and said pressurizeable tank.

BRIEF DESCRIPTION OF THE DRAWINGS

The features and advantages of this disclosure, and the manner of attaining them, will be more apparent and better understood by reference to the following descriptions of the disclosed system and process, taken in conjunction with the accompanying drawings, wherein:

FIG. 1 is a carbonation level reference chart to determine the volume of $CO_2$ in a liquid based on the temperature and pressure.

DETAILED DESCRIPTION OF THE INVENTION

Figure 1:
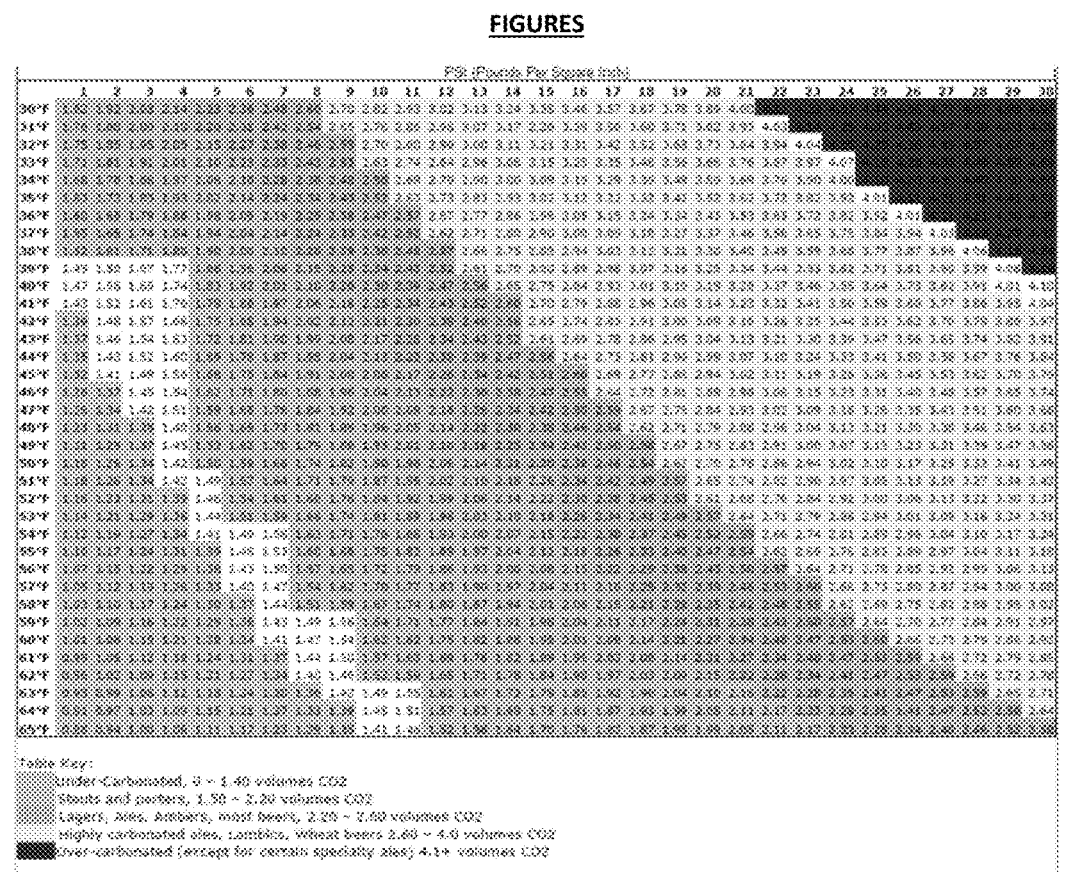
Figure 2:
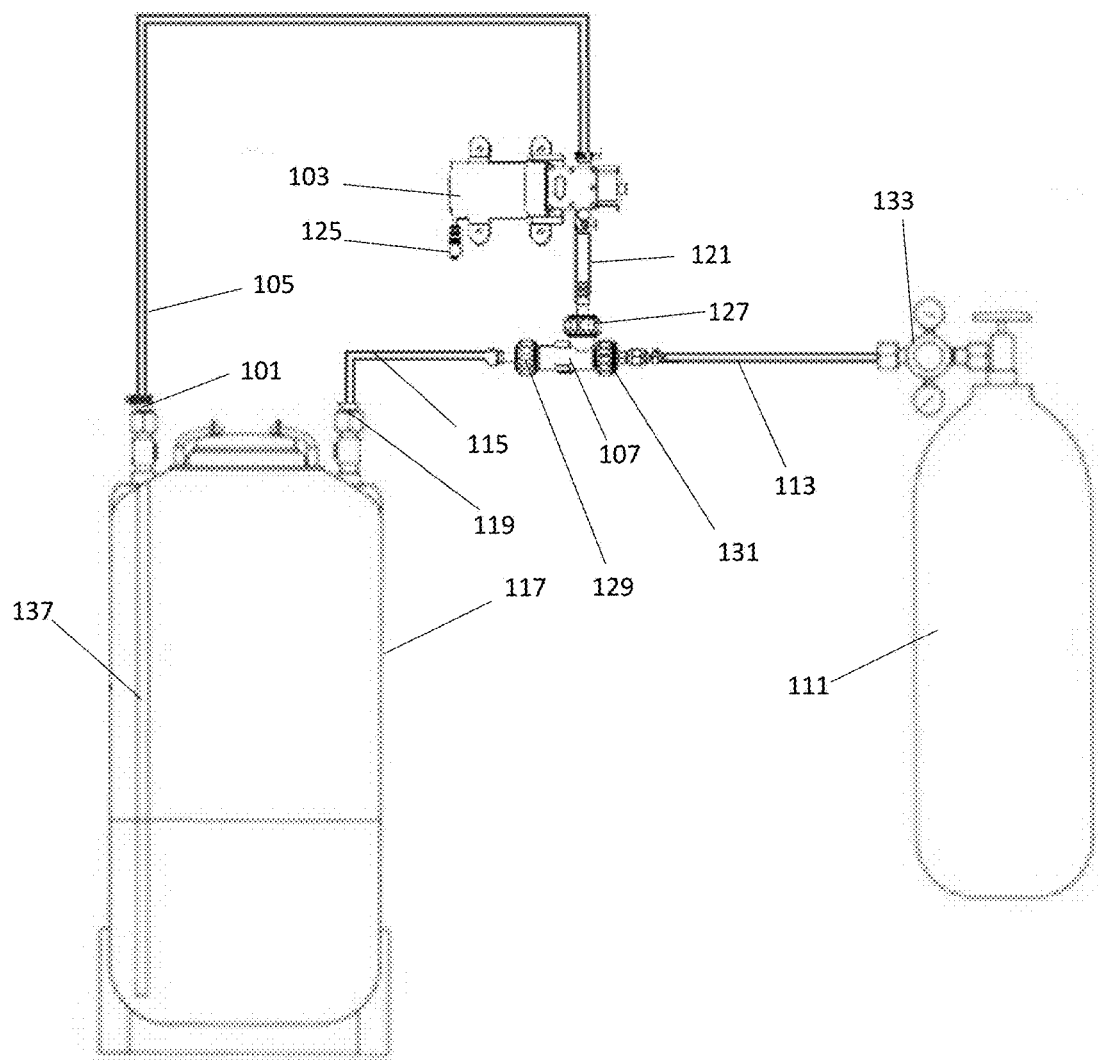
FIG. 2 is an illustration of a carbonation system using an in-line carbonator to carbonate a liquid in a vessel.
Figure 3:
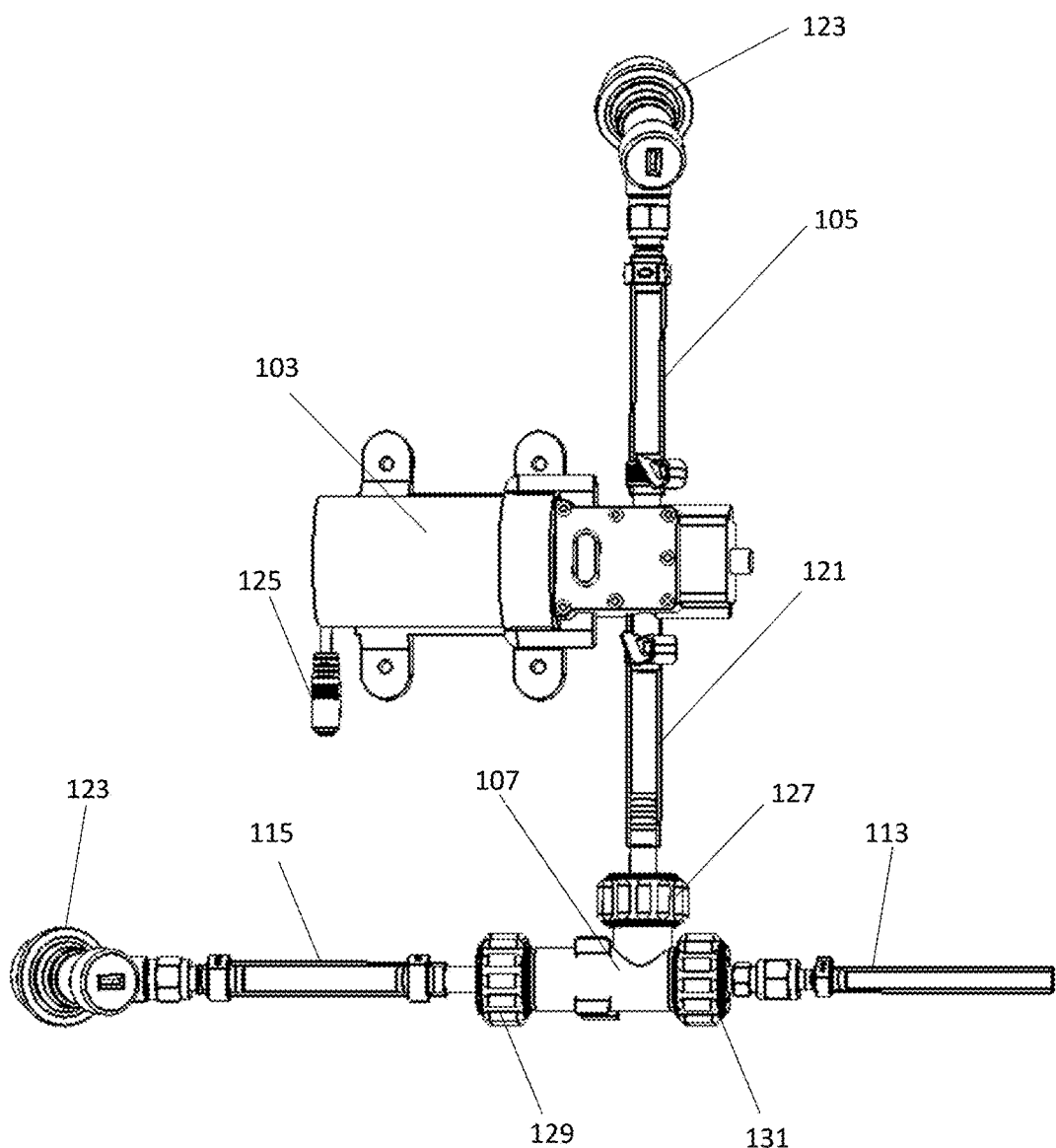
FIG. 3 is a perspective view of an exemplary embodiment of a carbonator used to carbonate a liquid.

The present invention relates to an apparatus and method for the carbonation of a liquid, such as beer. The present invention may also be used for nitrogenation of a liquid, such as beer, wine, cider, or other liquids. Referring specifically to beer, the carbonation process can take days to properly carbonate a beer to the desired saturation or solubility. The solubility of $CO_2$ can vary greatly depending on the temperature of the beer being carbonated and the pressure conditions of the beer and gas at equilibrium conditions. Equilibrium is achieved when the $CO_2$ ceases to dissolve into the beer. FIG. 1 is a carbonation level reference chart, illustrating the volume of $CO_2$ at different temperatures and pressures.

FIGS. 2-5 illustrate exemplary embodiments of a carbonating apparatus that comprise a closed, pressurized loop that is configured such that beer is recirculated from a vessel port 101 via a pump 103, through a first hose 105, to a fitting assembly 107 containing an in-line carbonation stone 109 that is connected to a compressed gas tank, such as a carbon dioxide ($CO_2$) tank 111 via a carbonation hose 113. It is understood that other types of compressed cases can be used other than $CO_2$ such as nitrogen. The beer is returned to the vessel 117 from the fitting assembly 107 via a second hose 115 to the inlet port 119 on the vessel. The pump 103 is fluidly connected to the fitting assembly 107. In some embodiments, an intermediary hose 121 can be used to fluidly connect the pump 103 and the fitting assembly 107. Any suitable means can be used to connect the hoses to each apparatus, such as quick disconnect fittings 123 shown in FIGS. 3-5. Other connectors can include hose clamps, band clamps, and other suitable clamps and hose fittings. In one exemplary embodiment the vessel 117 can be a sealable pressurizeable vessel. The vessel 117 can have at least one liquid/gas port, such as the vessel port 101 and the inlet port 119 that is able to allow a user to attach a hose to carbonate a liquid, such as beer, in the vessel 117. One or both of these ports can also be coupled to a tube 137 extending in the interior of the vessel 117 from the top of the vessel interior to about the bottom of the interior of the vessel 117. These ports can also be used to move beer in and out of the vessel 117. These connection ports can be check valves configured to stop the flow of a gas or liquid when the hose is removed. One exemplary embodiment of a vessel is a beer keg or a corny-type keg. Any suitable power source 125 can be used to power the pump, such as a battery or a plug for tapping into an electrical grid.

The carbonation system can be used to more rapidly carbonate the beer within a vessel. The vessel can first be placed under a first prescribed $CO_2$ pressure at a prescribed beer temperature to achieve an equilibrium $CO_2$ volume desired by the user. It is possible to carbonate the beer within the vessel without the initial pressurizing of the vessel as described above. In one exemplary embodiment, the carbonation method of the liquid can be accomplished without initially applying a first pressure to the vessel, but instead initiate the pressurization with a compressed gas via the carbonation stone. In this method the vessel is connected to a compressed gas tank and a pump using a fitting assembly, wherein the vessel contains a liquid. The pump can be activated to circulate the liquid from the vessel to the fitting assembly through a first hose and from the fitting assembly back into the vessel through a second hose. The pressurized gas can then be introduced into the liquid by the carbonation stone at the fitting assembly at a first pre-determined pressure until the liquid and vessel reach a pre-determined saturation point of gas in the liquid. The pump and pressurized gas can then be deactivated and the vessel disconnected from the pump and pressurized gas tank.

A $CO_2$ tank can be connected to the keg via a second carbonation hose that is coupled to a liquid/gas port on the vessel. For example, a beer at about 40° F. would typically be carbonated to a pressure of about 12 PSI to create a desired carbonation volume of about 2.5 times the original carbonation volume, which is one preferred level for many beers.

After the vessel is pressurized to the first prescribed $CO_2$ pressure, the carbonation apparatus 100, also referred to as a "carbonator," can be attached to the vessel 117. It is also understood that the carbonation apparatus 100 can be attached to the vessel 117 before or during the initial pressurization of the vessel. The carbonator can have a pump 103 that can be used to circulate the beer from the vessel, through a fitting assembly 107, and back into the vessel 117. In some embodiments, the fitting assembly 107 can be a three-way tee or wye fitting assembly having three ports: a fluid inlet port 127, a fluid outlet port 129, and a carbonation inlet port 131. The fitting assembly 107 is fluidly connected the pump 103. In one exemplary embodiment, the fluid inlet port 127 of the fitting assembly 107 can be fluidly connected to the pump 125 via the intermediary hose 121 and a second hose 115 can fluidly connect the fluid outlet port 129 and return the fluid or beer back to the vessel 117. The fitting assembly 107 can also have a porosity or carbonating stone 109 that can be coupled to the carbonation inlet port 131 and used to help with the carbonation process. The carbonation stone 109 can be fluidly connected to a $CO_2$ tank 111 via a first carbonation hose 113. In one exemplary embodiment, the pores of the stone have a diameter between about 0.5 microns and about 30 microns, between about 5 and 25 microns, or between about 10 and 20 microns.

It is known in the industry that as beer becomes more saturated with $CO_2$, the flow of $CO_2$ through the stone slows and the pressure in the vessel can rise above the recommended saturation pressure, thereby leading to over-carbonated beer. According to the present disclosure, one exemplary embodiment uses a carbonating stone comprising pores having a larger diameter of about 10 to about 20 microns, which unexpectedly exhibits a low restriction on the beer while still providing $CO_2$ bubbles adequately small to rapidly dissolve in the beer. The unexpected result is that the carbonating stone according to this disclosure allows a second prescribed carbonation pressure to be set only about one or two PSI above the first prescribed pressure applied to the vessel, thereby virtually eliminating the possibility of over-carbonation.

In addition, the second hose carrying the beer back to the vessel can be a saturation hose having a sufficient internal volume to reduce the velocity of beer through the second hose, allowing sufficient time for the dissolution of the larger gas bubbles into the beer prior to re-entering the vessel. In one preferred embodiment, the hoses can be a clear hose to allow a use to monitor the rate of $CO_2$ bubbles entering the beer and subsequently monitor when the bubble flow rate slows indicating saturation of the beer. The apparatus and method of the present disclosure enables beer to be carbonated to desired level in less than about three hours, such as less than about two hours, and even less than about one hour with little input from the user. In general, the time to carbonate about 5 gallons of beer is about one hour. That is, if the user fails to turn off the equipment after about an hour, the beer will not significantly over-carbonate from excessive carbonation time.

Figure 4:
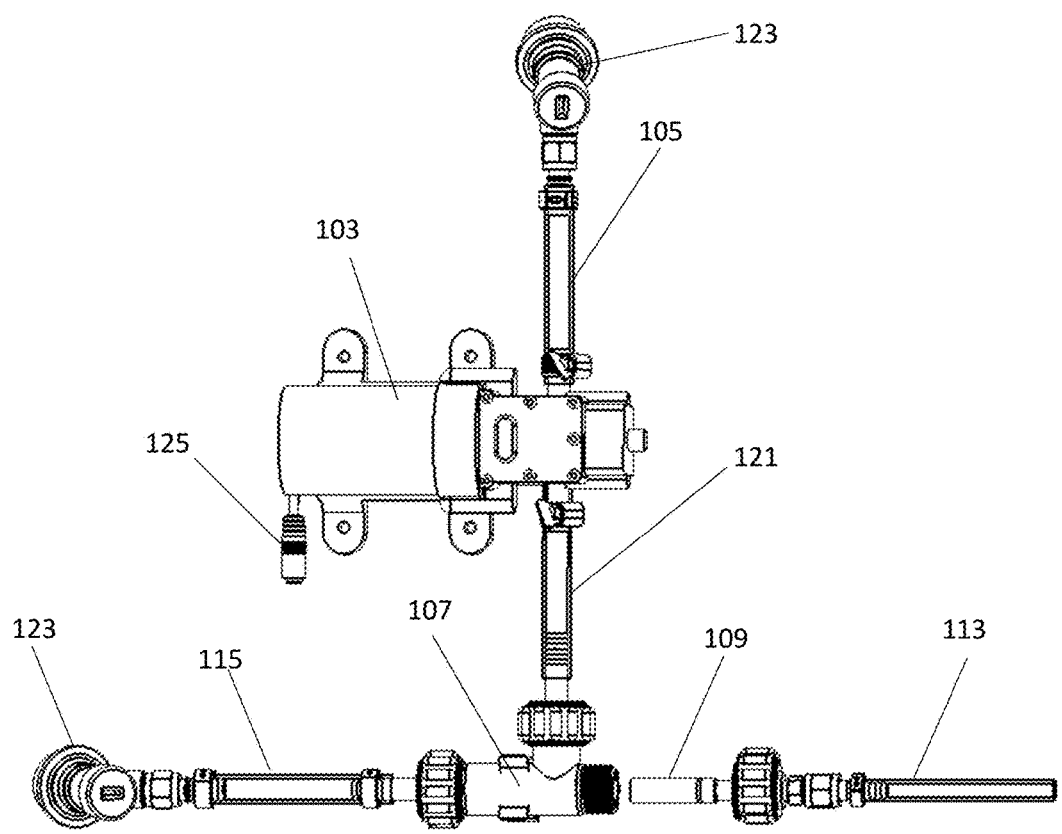
FIG. 4 is a partially exploded perspective view of exemplary embodiment of a carbonator used to carbonate a liquid, showing the carbonation stone.

As shown in FIG. 4, a carbonation stone 109 is configured proximate to the carbonation inlet 131; optionally, in some embodiments, the carbonation stone 109 is coupled to the carbonation inlet 131. The carbonation stone 109 can be fluidly connected to a $CO_2$ tank, which can be used to aid carbonating the fluid flowing through the fitting assembly 107. The same $CO_2$ tank used to apply a first pressure to the vessel can be used to provide a second pressure to the carbonation stone and fitting assembly. This can be accomplished with a dual carbonation regulator 133 coupled to the $CO_2$ tank 111 shown in FIG. 2. Similarly, a single tank with a single regulator can be used to pressurize the tank and then can be removed, readjusted to the second $CO_2$ pressure, and then connected to the $CO_2$ inlet of the apparatus. Alternatively, two separate tanks can be used to provide the first and second prescribed carbonation pressures to the vessel and fitting assembly respectively.

As the beer enters into the fitting assembly 107 from the fluid inlet 127, $CO_2$ from a carbonation stone 109 can create $CO_2$ bubbles that can be diffused into the liquid. The liquid can then exit the fitting assembly 107 through the fluid outlet 129, at which point the beer is circulated back to the vessel 117. This process can continue until the proper volume of $CO_2$ is achieved, as best shown in FIG. 1. In one exemplary embodiment, the second hose 115 can be a saturation hose that is configured to slow the velocity of the beer and $CO_2$ through the hose. This can aid in dissolution of the $CO_2$ into the beer by providing time and contact surface area with which to dissolve the $CO_2$.

Figure 5:
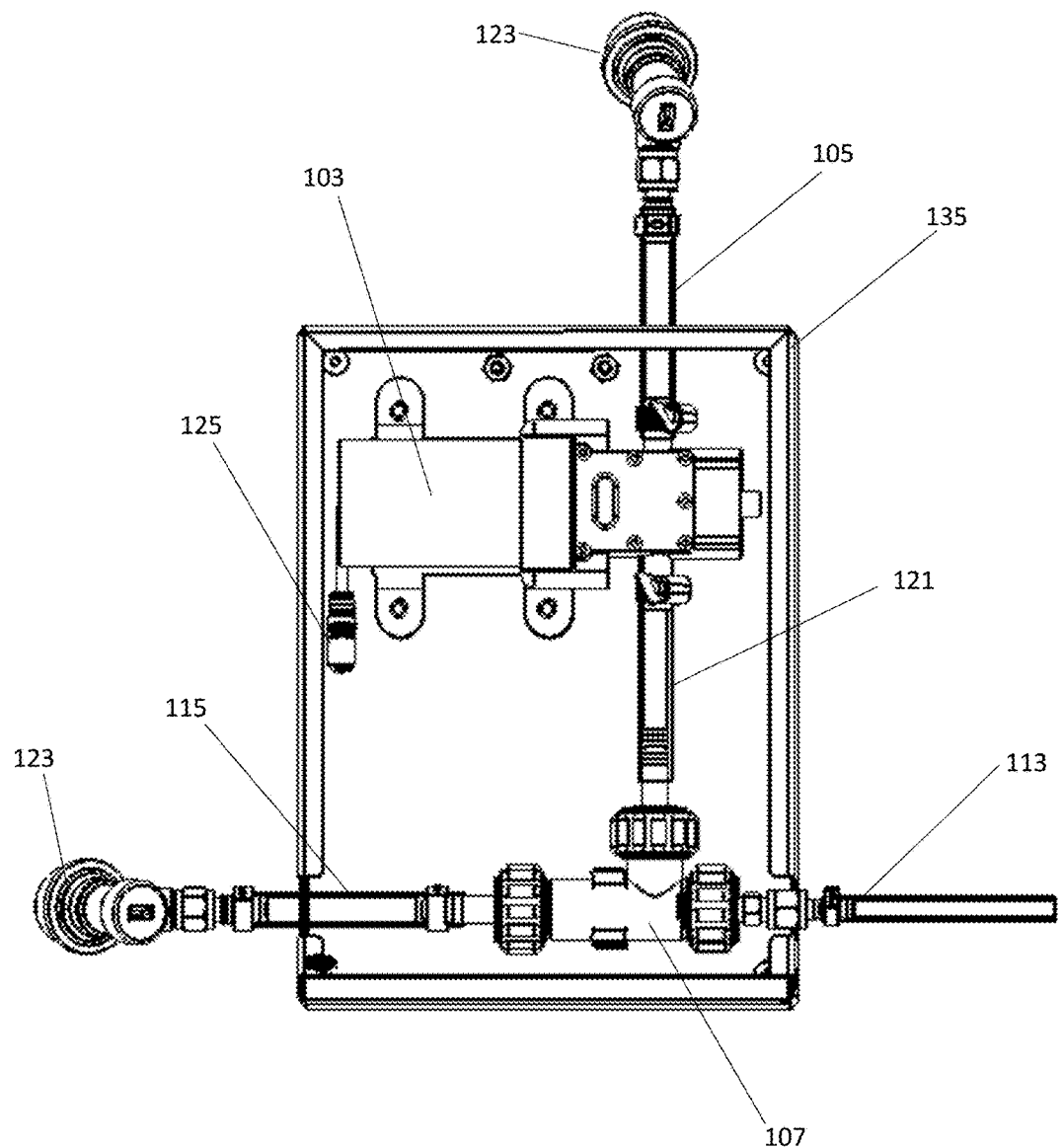
FIG. 5 is a perspective view of an exemplary embodiment of a carbonator used to carbonate a liquid coupled to a housing.

In one exemplary embodiment shown in FIG. 5, the carbonater 100 can be coupled to a housing 135. The housing can allow for easy transportation of the carbonater 100. Similarly, the housing can further comprise a handle to further the ease of moving the carbonater 100. Additionally, the carbonater housing 135 can further comprise hanging hooks to allow a user to hang the carbonater 100 on a vessel in a location proximate to the vessel.

Sanitizing and purging the hose and pump where the beer or $CO_2$ flows may be necessary and is recommended to avoid unwanted contamination and oxidation of the beer. The $CO_2$ pressure can be regulated and set to approximately 1 PSI to about 6 psi above the desired rating, in one example, about 13 PSI. If no bubbles are seen flowing in the hose the pressure can be increased, or the pressure can be decreased if the bubbles are not substantially dissolved before returning to the vessel.

According to the disclosed apparatus, the vessel's internal pressure will quickly reduce to below the saturation pressure by about 2 PSI due to the normal system flow restrictions until such time that the beer becomes close to the saturation point. Typical internal pressure will be at least about 10 or about 11 PSI. As the beer saturates with carbonation, the pressure will build in the system to the pressure set on the $CO_2$ supply, which in one exemplary embodiment can be about 12 PSI. According to the disclosure, the flow of carbonation bubbles will gradually dissipate when the beer is saturated with $CO_2$, which occurs in one example in about an hour at the desired temperature and pressure as illustrated in the chart of FIG. 1. The pump can then be turned off and the in-line carbonator can be removed from the vessel.

In one exemplary embodiment, the carbonator can be communicatively coupled to a timer to turn off the pump and the $CO_2$ from the tank. The timer can be communicatively connected to the pump and/or a valve regulator on a $CO_2$ tank control valve, such as an on/off valve or check valve. Upon expiration of a set time, the timer can send a signal to turn off the pump and signal a valve regulator to close the valve to the $CO_2$ tank, thereby ending the carbonation process. Alternatively, the $CO_2$ pressure applied to the beer can remain connected to the tank and left on and will not over carbonate the beer. A second tank can be used to keep the vessel under pressure and can be used for dispensing the beer. A dispensing system can use a $CO_2$ tank at a predetermined pressure with the keg in a controlled temperature environment. After the beer has achieved the desired volume of $CO_2$.

Additionally or alternatively, a sensor or apparatus can be used to measure the volume of $CO_2$ in the beer that is communicatively coupled to the timer. Upon reaching a predetermined volume of $CO_2$, the sensor can signal to the timer to turn off the pump and actuate the valve regulator to turn off the $CO_2$ tank that is connected to the carbonating stone. In an embodiment comprising both a timer and a $CO_2$ sensor, the $CO_2$ sensor can override the timer's signal and, instead, signal to the valve regulator to actuate and turn the pump off either before or after the timer's original set point.

In another exemplary embodiment, the carbonation system may comprise a controller that can be communicatively coupled to a pump, a valve regulator, a thermometer, and a $CO_2$ sensor. The thermometer can be located anywhere along the system to measure the temperature of the beer. One exemplary embodiment can have a thermometer located in the vessel containing beer. Similarly, a $CO_2$ sensor can be located anywhere in the system. An ideal location for the sensor can include the vessel containing the beer or in line with the hose prior to the beer re-entering into the vessel. This can help provide an accurate reading of the volume of $CO_2$ in the beer prior to recirculating into the vessel. Additional sensors and thermometers can be used throughout the system to take additional measurement as the beer is circulating through the system. The sensors and thermometers can be communicatively connected to the controller. The controller can be used to turn off the pump and actuate the valve regulator to turn off the $CO_2$ to the carbonating stone.

Another exemplary embodiment of the present invention can include a method that first involves pressurizing a vessel containing a liquid, such as beer, with a first desired pressure of $CO_2$ to establish an equilibrium pressure. An in-line carbonator can then be coupled to the vessel via a first and second hose. The in-line carbonator can have a pump and a fitting assembly, wherein the fitting assembly can have a fluid inlet port, a fluid outlet port, and a carbonation inlet port. The pump can then be activated and begin to circulate the beer from the vessel to the carbonator's fitting assembly using any suitable hose to transport the beer between the vessel and the in-line carbonator. While the beer is flowing through the fitting assembly, the fitting assembly can be pressurized at second pressure, wherein the second pressure is greater than the first pressure of the vessel. $CO_2$ can be introduced to the beer at the fitting assembly. Once a predetermined amount of time has elapsed or until the desired volume of $CO_2$ has been reached, the pump can be deactivated and the in-line carbonator can be disconnected from the vessel and from the carbon dioxide tank.

It will be apparent to those skilled in the art that various modifications and variations can be made in the disclosed system and method without departing from the scope of the disclosure. Other embodiments will be apparent to those skilled in the art from consideration of the specification and practice of the various implementations disclosed herein. It is intended that the specification and examples be considered as exemplary only, with a true scope being indicated by the following claims and their equivalents.

What is claimed is:

1. An apparatus for carbonating a liquid comprising:
   a pump having an inlet aperture and an outlet aperture, wherein when the pump is activated, the pump can circulate the liquid from the inlet aperture to the outlet aperture;
   a fitting assembly comprising:
      a carbonation inlet;
      a fluid inlet;
      a fluid outlet; and
      a carbonating stone configured to introduce carbon dioxide gas from a carbon dioxide source to the liquid, wherein said carbonating stone has a pore diameter configured to inhibit the over carbonation of the liquid by allowing for the pressure to the carbonation stone to be set at a final desired carbonation level of the liquid; and
   a first hose, wherein said first hose fluidly connects the outlet aperture of said pump to the fluid inlet of said fitting assembly.

2. The apparatus of claim 1, further comprising a timer, wherein said timer is communicatively coupled to the pump and configured to monitor and regulate the length of time the pump is turned to the on position.

3. The apparatus of claim 1, wherein said carbonating stone comprises pores having a diameter between about 0.5 microns and about 30 microns.

4. The apparatus of claim 1, wherein said carbonating stone comprises pores having a diameter between about 10 and about 20 microns.

5. The apparatus of claim 4, further comprising a controller configured to control the activation of the pump and the timer, wherein the apparatus is configured to carbonate at least five gallons of the liquid in an hour.

6. A system for carbonating a liquid comprising:
   at least one pressurizable tank having a control valve, wherein the tank contains a pressurized carbon dioxide gas for carbonating the liquid;
   at least one vessel containing said liquid, wherein said vessel has a first port and a second port;
   a carbonation apparatus comprising:
      a pump having an inlet aperture and an outlet aperture;
      a fitting assembly comprising:
         a carbonation inlet,
         a fluid inlet,
         a fluid outlet, and
         a carbonating stone, wherein said carbonation stone is fluidly connected to the carbonation inlet; and
      a first hose, wherein said first hose is configured to fluidly connect the outlet aperture of said pump to the fluid inlet of said fitting assembly; and
   a second hose configured to couple the fluid outlet to the first port of the vessel;
   a third hose configured to couple the pressurizable tank to the carbonation inlet; and
   a fourth hose configured to fluidly connect the second port to the fluid inlet aperture of the pump.

7. The system of claim 6, further comprising a timer, wherein said timer is communicatively coupled to the pump and configured to monitor and regulate the length of time the pump is turned to the on position.

8. The system of claim 6, further comprising a valve regulator coupled to said control valve, wherein said valve regulator is configured to actuate said control valve.

9. The system of claim 7, wherein said valve regulator and timer are communicatively connected.

10. The system of claim 6, wherein said timer and the pump are communicatively connected.

11. The system of claim 10, further comprising a thermometer, wherein said thermometer is coupled to said vessel and configured to measure the temperature of a liquid in the vessel.

12. The system of claim 11, further comprising a sensor configured to measure pressure of the liquid within said vessel.

13. The system of claim 12, further comprising a controller communicatively coupled to said sensor, thermometer, pump, and valve regulator.

14. The system of claim 6, wherein said carbonating stone comprises pores having a pore diameter between about 10 and about 20 microns, wherein the pore diameter is configured to reduce the ability to over carbonate the liquid through the fitting assembly and back into the vessel past a pre-determined carbonation level.

15. The system of claim 13, wherein the pump is configured to circulate the liquid from the vessel to the fitting assembly through the first hose and from the fitting assembly back into the vessel through the second hose.

16. The system of claim 15, wherein the controller is configured to actuate the control valve to introduce the carbon dioxide from the pressurizable tank into the liquid at the fitting assembly at a first pre-determined pressure until an equilibrium carbon dioxide gas volume is established within the vessel.

17. The system of claim 16, wherein said control can be configured to actuate the control valve to introduce the carbon dioxide to the carbonation stone at a second pre-determined pressure, wherein the second pressure is greater than the first pre-determined pressure.

18. The system of claim 17, wherein the second hose has an internal volume configured to reduce the velocity of the liquid flowing through the second hose and further increase the dissolution of the carbon dioxide into the liquid prior to re-entering the vessel.

19. The system of claim 18, wherein the first pressure is between 10 PSI and 12 PSI, and the second pre-determined pressure is between 12 PSI and 17 PSI.

20. The apparatus of claim 4, further comprising a second hose coupled to the fluid outlet of the fitting assembly, wherein said second hose has an internal volume configured to reduce the velocity of the liquid flow through the second hose and further increase the dissolution of the carbon dioxide gas into the liquid traveling through the second hose.

* * * * *